(12) United States Patent
Flynn et al.

(10) Patent No.: US 7,842,761 B2
(45) Date of Patent: Nov. 30, 2010

(54) BIODERIVED PLASTICIZER FOR BIOPOLYMERS

(75) Inventors: Allison Flynn, Grand Junction, CO (US); Lennard F. Torres, Pleasanton, CA (US)

(73) Assignee: Lapol, LLC, Santa Barbara, CA (US)

( * ) Notice: Subject to any disclaimer, the term of this patent is extended or adjusted under 35 U.S.C. 154(b) by 23 days.

(21) Appl. No.: 12/345,408

(22) Filed: Dec. 29, 2008

(65) Prior Publication Data

US 2009/0253871 A1    Oct. 8, 2009

Related U.S. Application Data

(60) Provisional application No. 61/041,993, filed on Apr. 3, 2008.

(51) Int. Cl.
*C08G 63/08* (2006.01)

(52) U.S. Cl. .................. 525/450; 525/437; 525/447; 525/448; 528/272; 528/302; 528/303; 528/304; 528/306; 528/308; 528/361

(58) Field of Classification Search ............ 525/450, 525/437, 447, 448; 528/361, 272, 302, 303, 528/304, 306, 308
See application file for complete search history.

(56) References Cited

U.S. PATENT DOCUMENTS

| | | | |
|---|---|---|---|
| 4,826,945 A | 5/1989 | Cohn et al. | |
| 5,142,062 A | 8/1992 | Knebel et al. | |
| 5,180,765 A | 1/1993 | Sinclair | |
| 5,247,013 A | 9/1993 | Shinoda et al. | |
| 5,252,642 A | 10/1993 | Sinclair et al. | |
| 5,281,647 A | 1/1994 | Eapen | |
| 5,403,897 A | 4/1995 | Ebato et al. | |
| 5,686,540 A * | 11/1997 | Kakizawa | .................. 525/444 |
| 6,051,663 A | 4/2000 | Yamamoto et al. | |
| 6,068,910 A | 5/2000 | Flynn et al. | |
| 6,111,004 A | 8/2000 | Biesiada et al. | |
| 6,235,825 B1 | 5/2001 | Yoshida et al. | |
| 6,326,440 B1 | 12/2001 | Terada et al. | |
| 6,372,844 B1 | 4/2002 | Shinoda et al. | |
| 7,030,181 B2 | 4/2006 | Moskala et al. | |
| 7,153,569 B2 | 12/2006 | Kaufman et al. | |
| 7,153,587 B2 | 12/2006 | Tan et al. | |
| 7,160,948 B2 | 1/2007 | Matsuo et al. | |
| 7,160,977 B2 | 1/2007 | Hale et al. | |
| 7,166,654 B2 | 1/2007 | Fujita et al. | |
| 7,226,655 B2 | 6/2007 | Iriya et al. | |
| 7,241,832 B2 | 7/2007 | Khemani et al. | |
| 7,256,223 B2 | 8/2007 | Mohanty et al. | |
| 7,265,160 B2 | 9/2007 | Oka et al. | |
| 2003/0180561 A1 | 9/2003 | Kuroki et al. | |
| 2004/0254332 A1 | 12/2004 | Hayes | |
| 2005/0182201 A1 * | 8/2005 | Matsumoto et al. | ......... 525/418 |

FOREIGN PATENT DOCUMENTS

| | | |
|---|---|---|
| EP | 0392759 A1 | 10/1990 |
| JP | 08-259680 | 10/1996 |
| WO | 9622268 A1 | 7/1996 |

* cited by examiner

*Primary Examiner*—David Wu
*Assistant Examiner*—Robert Jones, Jr.
(74) *Attorney, Agent, or Firm*—Kirton & McConkie; Evan R. Witt

(57) ABSTRACT

A bioderived plasticizer for biopolymers includes a compatibilizing unit and a polyester plasticizing unit. The plasticizer improves the flexibility of biopolymers while not adversely affecting their modulus. The compatibilizing unit renders the plasticizer more miscible with the desired base biopolymer and includes a lower alkyl ($C_3$ to $C_7$) organic acid. The polyester plasticizing unit is formed from monomers comprising a multifunctional alcohol and an aliphatic anhydride or its equivalent dicarboxylic acid and ester derivatives. The polyester plasticizing unit may optionally include one or more difunctional alcohols in combination with the multifunctional alcohol. The resulting the bioderived plasticizer has a low glass transition temperature (Tg), preferably between −20° C. to 30° C. The plasticizer is preferably amorphous.

32 Claims, No Drawings

BIODERIVED PLASTICIZER FOR BIOPOLYMERS

CROSS-REFERENCE TO RELATED APPLICATION

This application claims the benefit of prior filed Provisional Application No. 61/041,993, filed Apr. 3, 2008, which application is incorporated by reference.

BACKGROUND OF THE INVENTION

This invention relates to bioderived plasticizers for use with biopolymers. As used herein the term "bioderived" means made from plant-made molecules that are either directly expressed from plants, such as sugars, starches or fats, or fermented from plant-made molecules, such as sugars, starches, or fats. As used herein the term "biopolymers" means polymers made from plant derived molecules. The disclosed bioderived plasticizers improve the flexibility of the biopolymers without adversely affecting the Young's Modulus or bleeding out at high temperature or over time, such as in storage.

Polylactic acid (PLA) is becoming a widely used biomaterial due to its biocompatibility, biodegradability and sustainability. Polylactic acid is expected to expand its application base because the raw material L-lactic acid can be inexpensively produced in a large scale by a fermentation process, degradation velocity of polylactic acid is high in the compost, and polylactic acid is excellent in resistance to fungus and protection of foods from contamination of odor and color. Preparation of high molecular weight lactic acid polymers can be conducted by (1) ring-opening polymerization (ROP) of the dehydrated ring-formed dimer or dilactide, (2) polycondensation and manipulation of the equilibrium between lactic acid and the polylactide by removal of the reaction water using drying agents, or (3) polycondensation and linking of lactic acid prepolymers. Polylactic acid has the following general formula:

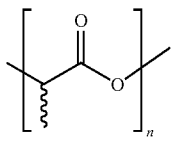

Polylactic acid has high rigidity and is unsuited for applications that require flexibility and toughness, such as agricultural multi-films, food packaging bags, garbage bags and other polymeric films, rigid durables such as computer casings and automotive parts and some packaging.

Generally known techniques for making polylactic acid flexible are (1) addition of a plasticizer, (2) copolymerization and (3) blending of flexible polymers. Though these techniques generally improve the flexibility of the polylactic acid, there are problems associated with their use. Technique (1) creates a material that generally has the properties needed for flexible films, but the production usually requires a large layout of capital which limits its use to large manufacturers of base resin. Technique (2) also "softens" polyesters like lactic acid or polyhydroxybutyrates (PHB), but the plasticizers tend to bleed out over time. Another issue is that techniques (1) and (2) lower the glass transition temperature of the resin composition but this also changes the physical properties such as making the material less strong as seen in a lowering of the tensile modulus.

Technique (3) usually involves blending a flexible and biodegradable resin. Examples include polybutylene terephthalate-adipic acid, polybutylene succinate, polyethylene succinate, and polycaprolactone. In some cases, additional plasticizers such as citrus esters are used in addition to the polymeric plasticizers (U.S. Pat. No. 7,166,654). Examples of these resins have been disclosed in BASF U.S. Pat. Nos. 5,817,721, 5,889,135, and 6,018,004, Eastman Chemical U.S. Pat. Nos. 6,342,304, 6,592,913, and 6,441,126, and Japanese Patent HEI 8-245866 and HEI 9-111107, which are incorporated herein by reference.

Linear polyesters of diols and diacids have been used as plasticizers for polymers from PVC to highly crystalline polyesters of polycarbonate, polylactic acid, and other polyhydroxyalkanoates. Several of these materials have been made commercially available including BASF Ecoflex, Eastman Chemical's EastStar Bio, and Showa High Polymer Company's Bionolle U.S. Pat. No. 5,324,794. Blends made with these materials tend to have reduced modulus and they are not optically clear.

However, in order to provide sufficient flexibility (an elastic modulus of 1,000 MPa or less) for polylactic acid, the technique requires the addition of a large amount of the flexible resin, for example, 60% by weight or more polybutylene succinate. This impairs certain desirable characteristics of polylactic acid, such as the Young's Modulus.

It would be an advancement in the art to provide a polymeric plasticizer that improves the flexibility of the biodegradable polymer without adversely affecting the Young's Modulus.

It would be a further advancement in the art to provide a plasticizing agent that can be blended into biodegradable polymers as well as petrochemically derived polyolefins to produce products, such as films used for garbage bags, packaging materials, injection molded parts, bottles and the like, that have excellent toughness and flexibility at low plasticizer concentrations without sacrificing physical properties such as the Young's Modulus.

It would be yet another advancement in the art to provide a polymeric plasticizer that may be blended with PLA, other polyesters such as PHAs, HIPS, ABS, polystyrene, or polyolefins such as polyethylenes, polypropylene, or copolymers of the polyethylene that shows improved compatibility and outstanding resistance to bleeding out at high temperature or over time.

It would be still another advancement in the art to provide a polymeric plasticizer that can be used grafted to the backbone of polyolefins using an unsaturation functionality of the copolymer plasticizer.

It would be a further advancement in the art to provide a polymeric plasticizer that can be used as a compatibilizer or an emulsifier for polyolefin/polyester blends and/or polyolefin/starch blends.

BRIEF SUMMARY OF THE INVENTION

Disclosed herein is a plasticizer for biopolymers made from renewable resources. The plasticizer also contains elements that allow it to be used as a compatible blend with petrochemically derived polyolefins. The invention includes copolymers of a compatibilizing unit and a polyester plasticizing unit. The invention improves the flexibility of biopolymers while not adversely affecting their modulus.

The compatibilizing unit is selected to form a more miscible blend with a desired base biopolymer with which the plasticizer will be used. The compatibilizing unit comprises a lower alkyl organic acid. In some embodiments, the lower alkyl organic acid comprises a $C_3$ to $C_7$ alkyl backbone. Some examples of the organic acid include, but are not limited to, lactic acid, butyric, valeric, and caprolactic acid. The lower alkyl organic acid may optionally comprise a hydroxyl moiety. In the case where the base polymer is PLA, the compatibilizing unit may comprise lactic acid.

The polyester plasticizing unit is formed from monomers comprising a multifunctional alcohol, a saturated or an unsaturated aliphatic anhydride or its equivalent, and optionally, a saturated aromatic anhydride or its equivalent. The anhydride "equivalent" includes its dicarboxylic acid and ester derivatives. The multifunctional alcohol may be selected from, but is not limited to, glycerin, trimethyl propanol, trimethoxypropane, trimethoxyethane, pentaerythritol, cyclohexanemethanediol, polyester oligomers of pentaerythritol, and mixtures thereof. The aliphatic anhydride or its equivalent may be selected from, but is not limited to, maleic anhydride, itaconic anhydride, fumaric acid, diacids of unsaturated fatty acids, and mixtures thereof. The saturated aromatic anhydride or its equivalent may be selected from, but is not limited to, phthalic anhydride, terephthalic acid, isophthalic acid, and mixtures thereof.

The plasticizing unit preferably has a molar ratio of the aliphatic anhydride or its equivalent to the aromatic anhydride or its equivalent in the range from 99:1 to 1:99. In some embodiments, the plasticizing unit has a molar ratio of the aliphatic anhydride or its equivalent to the aromatic anhydride or its equivalent in the range from 50:50 to 80:20. In other embodiments, the plasticizing unit has a molar ratio of the aliphatic anhydride or its equivalent to the aromatic anhydride or its equivalent in the range from 40:60 to 60:40.

The polyester plasticizing unit may optionally include one or more difunctional alcohols in combination with the multifunctional alcohol. In some non-limiting embodiments, the molar ratio of difunctional alcohols to multifunctional alcohols is from 5:95 to 95:5. The difunctional alcohol preferably has a carbon number in the range from 2 to 10. The difunctional alcohol may be selected from, but is not limited to 1,2 propanediol, 1,3 propanediol, ethylene glycol, diethylene glycol, neopentyl glycol, dipropylene glycol, dibromoneopentyl glycol, propoxylated bisphenol-A, ethoxylated bisphenol A, 2,2,4-trimethylpentane-1,3-diol, tetrabromobisphenol dipropoxy ether, triethylene glycol, tetraethylene glycol, 1,4-butanediol, 1,3-butanediol, 1,5 pentanediol, 1,6 hexanediol, 1,7 heptanediol, octanediol, cyclopentanediol, cyclohexanediol, cyclohexanedimethanol, and derivatives and mixtures thereof. Other non-limiting examples of the difunctional alcohol include oligomeric dialcohol terminated polyethers such as polyethyelene glycol and polytetrahydrofuran.

Copolymer plasticizer preferably has a molar ratio of the compatibilizing unit to the polyester plasticizing unit in the range from 30:70 to 60:40. The resulting copolymer plasticizer is preferably fabricated under conditions that produce a weight average molecular weight between about 1000 and 90,000 g/mol. The copolymer plasticizer may have a low glass transition temperature (Tg) below −20° C. to 30° C. The copolymer plasticizer is preferably amorphous.

In one non-limiting embodiment, the copolymer plasticizer is blended with polylactic acid, and the blend has an increased elongation at break by at least 200% without a decrease in Young's modulus compared to the unblended polylactic acid.

In some non-limiting embodiments, the polyester plasticizing unit is formed from monomers that include at least one chain extending monomer. The chain extending monomer may be selected from, but not limited to, diglycidyl ethers and epoxidized vegetable oils of linseed, soybean, or castor oil, and isocyanates such as MDI.

Some useful results may be obtained when the aliphatic anhydride is unsaturated and comprises double bonds that are conserved during the initial polymerization step with the compatibilizing unit, such as the PLA or PHAs. These double bonds are then available for grafting onto aliphatic polyolefins such as polyethylene, polypropylene, polystyrene, and ethylene-octene copolymers.

Due to the high price of renewable polymers such as PLA and PHB, there is presently much interest in making polyolefin/biopolymer blends and polyolefin/starch blends to increase the amount of renewable content in packaging (the Walmart Score Card). However, polystyrene and polyolefins are non-polar hydrophobic molecules that do not mix easily or well with hydrophilic polar biomolecules like PLA, PHAs, proteins and starch. The end result is an incompatible mixture with poor physical properties such as reduced tensile and yield strength of the parent polyolefin.

The compatibility between biomolecules like starch or PLA with polyolefins can be improved by introducing a coupling agent, reactive compatibilizer or an unreactive compatibilizer. The grafted biopolymer embodiment disclosed herein can be used as a compatibilizing agent for polyolefin/biopolyester blends and polyolefin/starch blends. By attaching the biopolymer compatibilizer disclosed herein onto the backbone of polyolefins such as polypropylene, or polyethylene or polystyrene in a reactive extrusion grafting step, one essentially increases the amount of hydrophilicity in the inherent hydrophobic polyolefin molecule. That means that instead of a blend, an amphipathic hybrid polymer molecule is created capable of homogeneous mixing with the highly polar, hydrophilic biopolyesters such as PLA, PHB, PHB/V, proteins, cellulose or starch. Furthermore, since the biopolymer unit of the copolymer compatibilizer disclosed herein is PLA, PHB or PHB/V, the grafted polyolefin-graft-biopolymer-compatibizer acts as a coupling agent for blends with virgin PLA, or PHB, or PHB/V, which in hand produces more homogeneous blends. Polyolefins, such as polypropylene, polyethylene or polystyrene, become more hydrophilic as they are grafted with the copolymer compatibilizer disclosed herein. As such, they become more receptive to hydrophilic starch and thus the emulsification of starch with the polyolefin is enhanced. The grafted polyolefins also are more receptive to biopolyesters, and the emulsification of biopolyesters with the polyolefins is enhanced. This enhanced emulsification and compatibilization translates into improved physical properties of the blends.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of alcohols, aromatic and aliphatic anhydrides and equivalents thereof, lower alkyl organic acids, and so forth. One skilled in the relevant art will recognize, however, that the invention may be practiced without one or more of the specific details or method steps, or with other methods, components, materials, and so forth. In other instances, well-known structures, materials, or operations are not shown or described in detail to avoid obscuring aspects of the invention.

Definitions

Multifunctional alcohol is defined to mean an alkanol comprising three or more hydroxyl groups. A multifunctional alcohol will typically be based on a C3 to C10 alkanol. A multifunctional alcohol includes, but is not limited to, triols, tetraols, etc. Difunctional alcohol or diol is defined to mean an alkanol comprising two hydroxyl groups. A difunctional alcohol will typically be based on a C2 to C10 alkanol.

The compatibilizing unit is a lower alkyl organic acid selected to form a more miscible blend with a desired base biopolymer or polymer. As one non-limiting example, if the base biopolymer is polylactic acid, then the compatibilizing unit is selected to be lactic acid.

The plasticizing unit is a polyester of a multifunctional alcohol, a saturated or unsaturated aliphatic anhydride or its equivalent, and a saturated aromatic anhydride or its equivalent. An "equivalent" of an aliphatic anhydride includes its dicarboxylic acid and ester derivatives. An "equivalent" of an aromatic anhydride includes its dicarboxylic acid and ester derivatives. The plasticizing unit may optionally contain a difunctional alcohol in addition to the multifunctional alcohol.

As used herein, a saturated aromatic molecule means an organic molecule that possesses a benzene ring on its backbone without additional double or triple bonds on its aliphatic chain.

As used herein, an unsaturated aliphatic molecule means an organic molecule that possesses no benzene rings and unsaturated bonds (double or triple bonds) on its backbone. The degree of unsaturation is generally between 0 and 50 mole %. When the aliphatic anhydride comprises unsaturated bonds, it may function as a grafting agent when blending with polyolefins such as polystyrene, polypropylene, polyethylene, and ethylene-octene copolymers.

It is known in the field that maleic anhydride can be grafted onto polyolefins, such as polypropylene, polyethylene and copolymers of ethylene-octene. Lyondell Basel (Rotterdam, The Netherlands), among other polyolefin companies, make and sell these products as emulsifying agents for hydrophilic-hydrophobic blends. K. Premphet, S. Chalearmthitipa in their article Melt Grafting of Maleic Anhydride Onto Elastomeric Ethylene-Octene Copolymer by Reactive Extrusion in Polymer Engineering and Science, November, 2001 have shown that it is possible to graft maleic anhydride onto the backbone of ethylene-octene copolymers using extraction extrusion. The grafting of maleic anhydride onto elastomeric ethylene-octene copolymer was performed in a co-rotating twin-screw extruder. Without initiator, some thermal grafting was observed. The degree of grafting was found to increase with the initiator concentration. At the same time, the amount of gel in the sample increased. Although increasing the initial monomer concentration led to a high percentage of grafting and low crosslinking, it resulted in a low degree of conversion. Improving the mixing of the reactants by increasing the screw speed also led to an increase in the percentage of grafting.

The double bonds of the unsaturated monomer unit were not compromised during the polycondensation reaction, as supported with FTIR data. The double bonds in the plasticizing polymer can thus be activated to graft onto polymers that possess a methine proton, such as polypropylene and polystyrene. The initiation of the grafting can be either by peroxide decomposition or by thermo-mechanical radical formation, whereby the radicals abstract hydrogen from the polymer chain. The double bond on the maleic anhydride (MA) monomer may then add to these macromolecules of polypropylene or polystyrene, thus forming a covalent bond between the polypropylene or polystyrene and the plasticizing polymer of the present invention.

As used herein, the term "amorphous" means little or no crystallinity and having random polymer chains with little or no order. Some small amount of crystallinity may be acceptable. Crystallinity may be measured by Dynamic Scanning Calorimetry (DSC), Dynamic Mechanical Thermal Analysis (DMTA) or X-ray Diffraction.

The invention is drawn to a plasticizer that may be used with biopolymers made from renewable resources. The biopolymers may include, but are not limited to, starch, and other polysaccharides such as cellulose and methylcellulose, polylactic acid (PLA) and polyhydroxyalkanoates (PHA), such as, polyhydroxybutyrate (PHB), polyhydroxyvalerate (PHV), polyhydroxyhexanoate (PHH), polyhydroxyoctanoate (PHO) and copolymers thereof. The plasticizer may also contain elements that allow it to be used as a compatible blend with petrochemically derived polyolefins. The plasticizer includes copolymers of a compatibilizing unit and a polyester plasticizing unit. Advantageously, the plasticizer improves the flexibility of biopolymers while not adversely affecting their modulus.

The compatibilizing unit is selected to form a miscible blend with a desired base polymer with which the plasticizer will be used. The compatibilizing unit generally comprises a lower alkyl organic acid. In some embodiments, the lower alkyl organic acid comprises a $C_3$ to $C_7$ alkyl backbone. Some examples of the organic acid include, but are not limited to, lactic acid, butyric, valeric, and caprolactic acid. The lower alkyl organic acid may optionally comprise a hydroxyl moiety. In the case where the base biopolymer is PLA, the compatibilizing unit may comprise lactic acid.

The polyester plasticizing unit is formed from monomers comprising a multifunctional alcohol, a saturated or unsaturated aliphatic anhydride or its equivalent, and a saturated aromatic anhydride or its equivalent. The anhydride "equivalent" includes its dicarboxylic acid and ester derivatives. The plasticizing unit preferably has a molar ratio of the aliphatic anhydride or its equivalent to the aromatic anhydride or its equivalent in the range from 99:1 to 1:99. In some embodiments, the plasticizing unit has a molar ratio of the aliphatic anhydride or its equivalent to the aromatic anhydride or its equivalent in the range from 50:50 to 90:10. In other embodiments, the plasticizing unit has a molar ratio of the aliphatic anhydride or its equivalent to the aromatic anhydride or its equivalent in the range from 40:60 to 60:40.

The polyester plasticizing unit may optionally include one or more difunctional alcohols in combination with the multifunctional alcohol. In some non-limiting embodiments, the molar ratio of difunctional alcohols to multifunctional alcohols is from 5:95 to 95:5. The difunctional alcohol preferably has a carbon number in the range from 2 to 10.

Copolymer plasticizer preferably has a molar ratio of the compatibilizing unit to the polyester plasticizing unit in the range from 30:70 to 60:40. The resulting the copolymer plasticizer is preferably fabricated under conditions that produce a weight average molecular weight between about 1000 and 50,000 g/mol. The copolymer plasticizer may have a low glass transition temperature (Tg) below −20° C. to 30° C. The copolymer plasticizer is preferably amorphous.

One embodiment of the invention is a polylactic acid-based plasticizer composition comprising 50 to 90 mole % of polylactic acid as the compatibilizing unit and 10 to 50 mole % of an aliphatic/aromatic polyester plasticizing unit made with difunctional and multifunctional alcohols and aliphatic unsaturated diacids or anhydrides and saturated aromatic diacids or anhydrides. Plasticizers made with the formulation described herein are amorphous with little or no crystallinity. They may also have a Tg at or below room temperature.

The lactic acid used to form the compatibilizing unit of the plasticizer can be any of the isomers of lactic acid, L, D, or meso. In one presently preferred embodiment, L lactic acid is used due to its availability and low cost.

The Polyester Plasticizing Unit is Composed of the Following:

(a) aliphatic anhydride units (or equivalent dicarboxylic acid or ester derivatives). Aromatic anhydride units may optionally be used with aliphatic anhydride units. When aromatic anhydride units are used, the molar ratio of aliphatic to aromatic anhydride is from 95:5 to 5:95. In some embodiments within the scope of the invention, the aliphatic anhydride (or equivalent dicarboxylic acid) is unsaturated, with the degree of unsaturation for the entire molecule generally between 0 and 50 mole % as measured by the mole % of unsaturated anhydride or derivative added in the formulation.

(b) difunctional and multifunctional hydroxyl units. The molar ratio of diols to multifunctional alcohols is from 0:100 to 95:5. The difunctional alcohol is a linear unit, whereas the multifunctional alcohol is a branched unit.

The polyester plasticizer can be made through direct polycondensation of the carboxylic acid unit (anhydride equivalent) and the alcohol unit, either using reduced pressure or a carrier gas to remove the water of reaction. One can either polymerize to high molecular weight directly, or make short chain oligomers and chain extend using a small amount of a chain-extender. If a chain extending agent is used, it may be selected from highly reactive nucleophilic agents, including but not limited to, isocyanates, digycidyl ethers, vinyl ethers or amines and azo compounds, and epoxidized vegetable oils of linseed, soybean, or castor oil.

Polycondensation is a simple, relatively inexpensive and low-tech means of producing low to medium molecular weight polyesters and polyamides. It has the advantage over ring opening polymerization in that it eliminates one of the steps in the process, thus making it a simpler, potentially less expensive alternative. However, it generally tends to take more time, and produce lower molecular weight species with broad molecular weight distributions. For the purpose of producing adhesives and adhesive films, sizing, plasticizers and binders this process can be cost effective.

The unsaturated aliphatic anhydride or its equivalent may be selected from, but is not limited to, maleic anhydride, itaconic anhydride, fumaric acid, diacids of unsaturated fatty acids, and mixtures thereof. The saturated aromatic anhydride or its equivalent may be selected from, but is not limited to, phthalic anhydride, terephthalic anhydride, isophthalic anhydride, and mixtures thereof.

Additional anhydrides and equivalent carboxylic acid units may be selected from, but are not limited to, maleic acid, itaconic acid, fumaric acid, dodecanoic diacid, succinic acid, glutaric acid, adipic acid, palmitic acid, suberic acid, azelaic acid, sebacic acid, isophthalic acid, terephthalic acid, hexacloroendomethylene tetrahydrophthalic acid, chlorendic anhydride, tetrahydrophthalic anhydride, hexahydrophthalic anhydride, endomethylene tetrahydrophthalic anhydride, tetrachlorophthalic anhydride, tetrabromophthalic anhydride, chloromaleic acid, citraconic acid, mesaconic acid, and ester derivatives thereof, and mixtures thereof, can be used.

Difunctional alcohols or diols may be selected from the group consisting of, but are not limited to, 1,2 propanediol, 1,3 propanediol, ethylene glycol, diethylene glycol, triethylene glycol, polyethylene glycol, tetraethylene glycol, polytetrahydrofuran, neopentyl glycol, propylene glycol, dipropylene glycol, dibromoneopentyl glycol, propoxylated bisphenol-A, ethoxylated bisphenol A, 2,2,4-trimethylpentane-1,3-diol, tetrabromobisphenol dipropoxy ether, 1,4-butanediol, 1,3 butanediol, 1,5 pentanediol, 1,6 hexanediol, 1,7 heptanediol, octanediol, cyclopentanediol, cyclohexanediol, cyclohexanedimethanol, or their derivatives and mixtures thereof. Difunctional alcohols having a carbon number of 2-10 are presently preferable.

Multifunctional alcohols can be selected from the group consisting of, but are not limited to, glycerin, trimethyl propanol, trimethoxypropane, trimethoxyethane, pentaerythritol, cyclohexanemethanediol, polyester oligomers of pentaerythritol such as Capa 4101, and mixtures thereof.

Branching has been shown to improve the melt viscosity. Monomers with a functionality greater than two can be used for this purpose. The multifunctional monomer can be either the carboxylic acid unit, the alcohol unit, or multifunctional hydroxycarboxylic acids. Specifically, multifunctional components such as maleic acid, tartaric acid, citric acid, trimellitic acid, pyromellitic acid, glycerin, pentaerythritol and trimethylol propane or oligomers of esters made with pentaerythritol such as Capa 4101 may be used. One needs to be careful in selecting the branching agent as well as the concentration used. If the concentration of branching agent is too high, then the resulting polymer may gel. If gels are formed, blending compatibility may be compromised. Films made from incompatible blends tend to have a rough, bumpy appearance, and poor mechanical properties.

Synthesizing the Polyester Plasticizers

The polyesters described herein can be made using techniques well known in the art. According to one non-limiting example, the polyesters may be synthesized neat (or in a solvent or cosolvent) using condensation polymerization and transition metal acid catalysts such as organometallic tin at concentrations below about 200 ppm. Water from the reaction may be collected using a column condenser. The reaction is monitored using acid number and viscosity measurements. A number of monomer combinations can be used to make polyesters suitable for the bio-based plasticizer. In one non-limiting embodiment, glycerin and diethylene glycol is reacted neat with maleic anhydride at 150° C. for two hours. 200 ppm of stannous octanoate is added at the beginning of the reaction. After two hours, lactic acid is added and the reaction allowed to continue until the Brookfield viscosity of 255 Poise at 100° C./50 rpms, spindle number 6. This reaction is illustrated in Schematic 1.

dicumyl peroxide, lauroyl peroxide, cumene hydroperoxide, p-methane hydroperoxide, a-pinene hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl per-

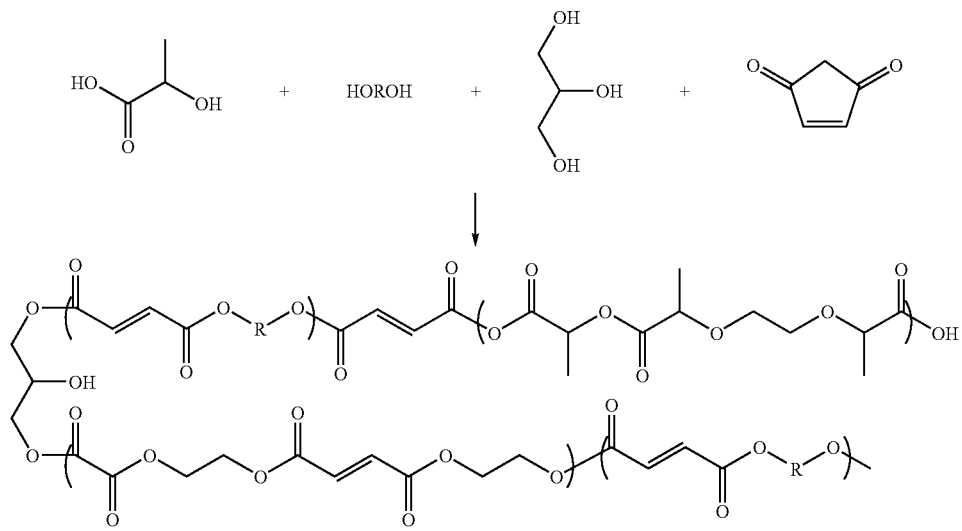

Schematic 1: Polymerization of bio-based Polyester.

Grafting Polyolefins to the Polyester Plasticizers

Grafting may be conducted in a reactive extruder using standard free radical initiators. In one embodiment, 0.001% of benzyl peroxide is free blended in the prepolymer and then loaded into the extruder. Standard extrusion techniques are employed for this operation. Other suitable free radical initiators include, but are not limited to, potassium persulfate, ammonium persulfate, Benzyl peroxide, di-t-buty peroxide, oxybenzoate, and the like; and the various alkyl perketals such as 2,2-bis-(t-butylperoxy)butane, ethyl 3,3-bis(t-butylperoxy)butyrate, 1,1-di(t-butylperoxy)cyclohexane, and combinations thereof. One non-limiting example of this reaction, the grafting of polypropylene to the multiunsaturated bio-derived plasticizer that is described herein, is shown below in Schematic 2.

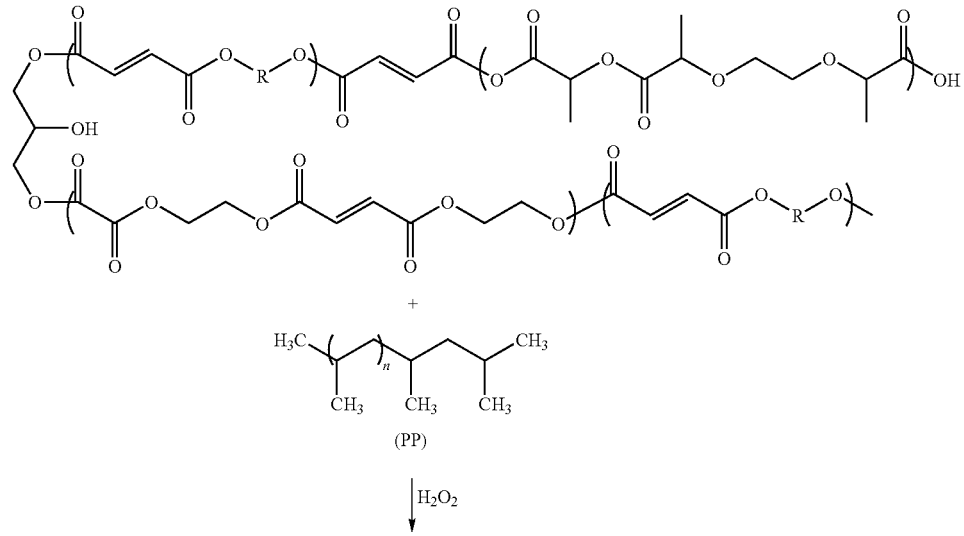

Schematic 2: Grafting of polypropylene to a multiunsaturated bio-derived plasticizer.

-continued

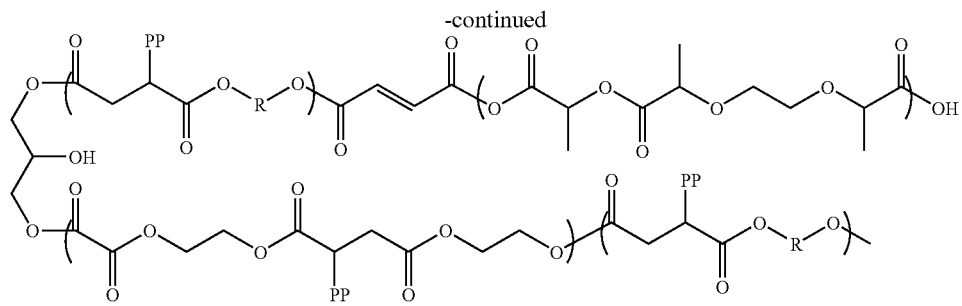

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLE 1

Sample No. AF011508

19 g glycerin, 70 g diethylene glycol were charged into a 3 neck round bottom flask with a condenser. 91 g maleic anhydride were then added and the vessel put into a 80° C. oil bath. These reagents were allowed to react for 20-30 minutes until an exotherm was observed. The temperature allowed to come back down. At this point, 168 g lactic acid (88% solution in water) and 1.11 g of tin(II) octanoate were added to the reaction mixture. The vessel was heated to 170° C. and allowed to react until the acid number was reduced from 282 to 18. When the Acid number reached 18.9 g of phthalic anhydride were added to the reaction and allowed to react for one hour. The reaction products were then poured out and analyzed.

EXAMPLE 2

Sample No. LT020108

41.8 g glycerin, 154.0 g diethylene glycol, and 200.0 g succinic anhydride, and 2.69 g stannous octanoate and 0.77 g hydroquinone were charged into a 1000 mL four neck reaction vessel with an overhead stirrer, condenser and collection flask and a nitrogen purge. The reaction was heated to 80° C. under a nitrogen blanket and allowed to exotherm. At the end of the exotherm, 434.82 g of 88% lactic acid were added to the reaction mixture and the temperature increased to 170° C. The reaction was then allowed to react until the acid number dropped below 30. At that time 9.5 g of phthalic anhydride were added to the reaction mixture and allowed to stir under heat for about one hour. The reaction products were then poured out and analyzed.

EXAMPLE 3

Sample No. LT020708

41.8 g glycerin, 154.0 g diethylene glycol, and 200.0 g maleic anhydride, and 2.69 g stannous octanoate and 0.77 g hydroquinone were charged into a 1000 mL four neck reaction vessel with an overhead stirrer, condenser and collection flask and a nitrogen purge. The reaction was heated to 80° C. under a nitrogen blanket and allowed to exotherm. At the end of the exotherm, 434.82 g of 88% lactic acid were added to the reaction mixture and the temperature increased to 170° C. The reaction was then allowed to react until the acid number dropped below 3. At that time 9.0 g of phthalic anhydride were added to the reaction mixture and allowed to stir under heat for about one hour. The reaction products were then poured out and analyzed.

EXAMPLE 4

Sample No. LT021908

32.2 g glycerin, 118.5 g diethylene glycol, and 154.0 g maleic anhydride, and 2.09 g stannous octanoate were charged into a 1000 mL four neck reaction vessel with an overhead stirrer, condenser and collection flask and a nitrogen purge. The reaction was heated to 120° C. under a nitrogen blanked and allowed to exotherm and continue to react until the acid number dropped below 150. Then, 479.6 g of 88% lactic acid were added to the reaction mixture. The temperature was increased to 170° C. and the reaction was allowed to react until the acid number dropped below 11. At that time 9 g of phthalic anhydride were added to the reaction mixture and allowed to stir under heat for about five hours. The reaction products were then poured out and analyzed.

EXAMPLE 5

Sample No. LT022808A 41.8 g glycerin, 154.0 g diethylene glycol, and 200.0 g maleic anhydride, and 2.69 g stannous octanoate and 0.77 g hydroquinone were charged into a 1000 mL four neck reaction vessel with an overhead stirrer, condenser and collection flask and a nitrogen purge. The reaction was heated to 80° C. under a nitrogen blanket and allowed to exotherm. At the end of the exotherm, the temperature was increased to 170° C. and the reaction was allowed to react until the acid number dropped below 35. Then, 434.82 g of 88% lactic acid were added to the reaction mixture. The temperature was increased to 170° C. and the reaction was allowed to react until the acid number dropped below 30. 9.0 g of phthalic anhydride were added and reacted for about one hour. The reaction products were then poured out and analyzed.

EXAMPLE 6

Sample No. LT030308

41.8 g glycerin, 154.0 g diethylene glycol, and 200.0 g maleic anhydride, and 2.69 g stannous octanoate and 0.77 g of hydroquinone were charged into a 1000 mL four neck reaction vessel with an overhead stirrer, condenser and collection flask and a nitrogen purge. The reaction was heated to 80° C. under a nitrogen blanket and allowed to exotherm. At the end of the exotherm, the temperature was increased to 170° C. and the reaction was allowed to continue to react until the acid number dropped below 40. Then, 434.82 g of 88% lactic acid were added to the reaction mixture. The temperature was increased to 170° C. and the reaction was allowed to react until the acid number dropped below 30. The reaction products were then poured out and analyzed.

EXAMPLE 7

Sample No. LT030508A 237 g glycerin, 872 g diethylene glycol, and 1134 g maleic anhydride, and 15 g stannous octanoate were charged into a 5000 mL four neck reaction vessel with an overhead stirrer, condenser and collection flask and a nitrogen purge. The reaction was heated to 120° C. under a nitrogen blanked and allowed to exotherm and continue to react until the acid number dropped below 150. Then, 2463 g of 88% lactic acid were added to the reaction mixture. The temperature was increased to 170° C. and the reaction was allowed to react until the acid number dropped below 20. At that time 150 g of phthalic anhydride were added to the reaction mixture and allowed to stir under heat for about one hour. The reaction products were then poured out and analyzed.

EXAMPLE 8

Sample No. LT031208

41.8 g glycerin, 154.0 g diethylene glycol, and 200.0 g maleic anhydride, and 2.69 g stannous octanoate and 0.77 g hydroquinone were charged into a 1000 mL four neck reaction vessel with an overhead stirrer, condenser and collection flask and a nitrogen purge. The reaction was heated to 80° C. under a nitrogen blanket and allowed to exotherm. At the end of the exotherm, the temperature was increased to 170° C. and the reaction was allowed to react until the acid number dropped below 70. Then, 434.82 g of 88% lactic acid were added to the reaction mixture. The temperature was increased to 170° C. and the reaction was allowed to react until the acid number dropped below 30. 9.0 grams of phthalic anhydride were added and allowed to react for about one hour. The reaction products were then poured out and analyzed.

EXAMPLE 9

Lapol 108

1894 g glycerin, 7000 g diethylene glycol, and 9070 g maleic anhydride, and 120 g stannous octanoate were charged into a 10 gallon four neck reaction vessel with an overhead stirrer, condenser and collection flask and a nitrogen purge. 77 grams of TNPPhosphite were added to the reaction to stabilize the color of the reaction. The reaction was heated to 120° C. under a nitrogen blanked and allowed to exotherm and continue to react until the acid number dropped below 150. Then, 19000 g of 88% lactic acid were added to the reaction mixture. The temperature was increased to 170° C. and the reaction was allowed to react until the acid number dropped below 50. At that time 1200 g of phthalic anhydride were added to the reaction mixture and allowed to stir under heat for about one hour. The reaction products were then poured out and analyzed.

The polyester plasticizer prepared according to the procedures described herein were characterized to determine molecular weight by gel permeation chromatography ("GPC"), Tg and Tm by Dynamic Scanning Calorimetry ("DSC"), degradation onset temperature by thermagravitational analysis ("TGA"), and viscosity according to the procedures described below. Blends of the plasticizer and polylactic acid (PLA) were prepared and tested for tensile strength as described below.

Glass Transition Temperature Tg

Glass Transition Temperature Tg and the lack of a Melting Enthalpy $\Delta H_m$ were measured with a TA Instruments Differential Scanner Calorimeter provided with a liquid nitrogen cooling system. The instrument was calibrated with a high purity standard (indium). About 10 mg of polymer were placed in an aluminum capsule and cooled to $-100°$ C. The temperature was held for 30 minutes and then heated at a rate of 10° C./min. A second heating was conducted by first heating to 80° C. and holding this temperature for 30 minutes. The sample was then re-cooled to $-100°$ C. and ramping back up to 180° C. at a rate of 10° C./min (2 scanning). Tg was obtained from the thermogram of the second scanning, in order to have a uniform thermal history of the samples. No melting temperature was seen on the DSC curves for any of the samples.

GPC—Molecular Weight

Gel permeation chromatography was run on a Waters 2414 Refractive Index Detector with 2 columns: Styragel HR 4E THF and HR 1 THF, both 7.8×300 mmDetection used Waters 2414 Differential Refractometer with temperature control. A flow rate of 1 mL/min is used with an injection of 100 μL of a 0.05% solution in chloroform. Polystyrene standards are used as controls. Optimal molecular weight was between 2,000 and 90,000 g/mol with a molecular weight distribution greater than 4.

TGA—Degradation Onset

Thermagravitational analysis was conducted using a TA Instruments Hi-Res TGA 2950 Thermogravmetric Analyzer. A 20 mg sample was prepared and was placed onto the TGA sample pan. The sample was then heated to 500° C. at a rate of 10° C./minute. Optimal degradation temperatures were greater than 250° C.

Viscosity—Branching and Molecular Weight

Viscosity was measured using a TA Instruments Advanced Rheometer 2000. About a 500 mg sample was placed the flat bottom plate that is heated to 100° C. A rotating disc is lowered onto the sample and allowed to spin at 750 rpms on the sample at temperature. The instrument is internally calibrated and displays a reading after about 30 seconds. The reading is measured in Poise and recorded for temperature and rpms. The preferred viscosity is between 200 and 900 Poise when measured using a Brookfield viscometer at 100 C and 50 rpm, spindle #6.

Polymer Blends

Blends were made using a Haake melt mixer (Rheomix 600) with a Rheomix 9000 controller. PLA from Nature-Works with a weight average molecular weight of 100,000 g/mole was dried overnight in a 70° C. oven with Dryrite used as a moisture absorber. 10, 20 and 30% samples of the plasticizer invention were weighed on a milligram analytical balance as was the predried PLA. PLA was transferred into a preheated 180° C. Haake mixing bowl using sigma blades rotating at 70 rpms. After the PLA is melted, the plasticizer invention was transferred into the mixing bowl and allowed to blend for about 7 minutes. The blend was then collected and pressed into thin films for tensile testing. The resulting 10% blends were optically clear.

Film Preparation and Tensile Testing

Films were pressed using a Carver press operated using a computer interface. 20 grams of polymer blend were placed between two pieces of Mylar film sitting on two 12"×12" aluminum plates with 0.60 mm wedges. The polymer was sandwiched between the Mylar and the aluminum and placed on the bottom platen of the Carver press. The platens were closed to just touching to allow the polymer to melt without pressure for two minutes. After two minutes, the press was allowed to close under 2000 psi pressure for 30 minutes. The press was then opened and the plates removed and allowed to cool to room temperature. The polymer films were then removed and cut into tensile bars. The general thickness of the films was nominally 0.55 mm.

Tensile testing was conducted according to ASTM Standard D638. The samples were allowed to equilibrate at 23° C. for 40 hours at 50% humidity. Type V test specimens were used with a nominal thickness of 0.55 mm. The samples were then pulled at a rate of 5.0 mm/min until broken. At least five samples were tested and the number reported is an average.

factured by Hallstar Company, Chicago Ill. Ecoflex is a biodegradable polymer used as a plasticizer with PLA made by BASF, Germany.

It will be appreciated that the disclosed bioderived plasticizers may improve the flexibility of biopolymers without adversely affecting the Young's Modulus.

It will further be appreciated that the disclosed bioderived plasticizers may be blended with biopolymers as well as petrochemically derived polyolefins to produce polymeric products having excellent toughness and flexibility at low plasticizer concentrations without sacrificing physical properties such as the Young's Modulus.

It will be appreciated that disclosed bioderived plasticizers may be blended with PLA or polyolefins that show outstanding resistance to bleeding out at high temperature.

It will be appreciated that the disclosed bioderived plasticizers show improved miscibility with base biopolymers and have improved optical clarity.

While specific embodiments of the present invention have been illustrated and described, numerous modifications come to mind without significantly departing from the spirit of the invention, and the scope of protection is only limited by the scope of the accompanying claims.

TABLE 1

Physical properties of plasticizing agent with 60 mole % L-lactic acid

| Sample No. | Viscosity 100° C. @ 750 rpm (Poise) | Onset Tg (° C.) | Tg (° C.) | Mn | Mw | PD | Onset Degradation Temp (° C.) | Peak Degradation Temp (° C.) |
| --- | --- | --- | --- | --- | --- | --- | --- | --- |
| AF011508 | 74 | −5.49 | 1.35 | 11,000 | 11,000 | 1.01 | 292 | 357 |
| LT020108 | 382 | −4.79 | 2.22 | 15,000 | 16,000 | 1.10 | 319 | 389 |
| LT020708 | 64 | −7.53 | 0.62 | 15,000 | 16,000 | 1.11 | 290 | 341 |
| LT021908 | 246 | 5.44 | 14.56 | 11,000 | 11,000 | 1.01 | 303 | 347 |
| LT022808A | 600 | −21.78/3.80 | −13.34/9.13 | 24,000 | 39,000 | 1.62 | 287 | 354 |
| LT030308 | 253 | 1.08 | 8.81 | 16,000 | 20,000 | 1.20 | No data | No data |
| LT030508A | 553 | −19.88/1.96 | −14.83/5.95 | 24,000 | 39,000 | 1.63 | No data | No data |
| LT031208 | 581 | −17.96/3.91 | −14.27/8.83 | | | | 260 | 337 |
| Lapol 108 | 581 | −10.00 | −5.00 | 2,300 | 90,000 | 45 | 295 | 337 |

TABLE 2

Physical properties of Polylactic acid blends with 10% compatibilizing agent

| Sample No. | Modulus (MPa) | Elongation @ Break (%) | Tensile @ Peak (MPa) |
| --- | --- | --- | --- |
| PLA | 1600 | 8 | 57 |
| Ecoflex ® | 1081 | 247 | 32 |
| Hallgreen ® R-4010 | 1200 | 12 | 37 |
| AF011508 | 1200 | 220 | 39 |
| LT031208 | 1600 | 165 | 41 |
| LT020108 | 1600 | 200 | 46 |
| LT022808A | 1769 | 70 | 37 |
| LT030508A | 1900 | 40 | 60 |
| LT030308 | 1224 | 83 | 42 |
| Lapol 108 | 1600 | 200 | 57 |

Samples identified in Tables 1 and 2 refer to 20% blends of the bioderived plasticizer described in this disclosure in polylactic acid referred to as PLA. Also included in these tables are PLA alone and with other polyester controls. The controls are 20% blends of Ecoflex® in PLA and Hallgreen® polyester plasticizers in PLA. PLA is manufactured by NatureWorks® and is available through Jamplast, Inc., Ellisville, Mo. Hallgreen R-4010 is a bioderived ester plasticizer manu-

The invention claimed is:

1. A copolymer plasticizer comprising:
   a compatibilizing unit comprising a lower alkyl organic acid; and
   a polyester plasticizing unit formed from monomers comprising:
      a multifunctional alcohol;
      an aliphatic anhydride or its equivalent; and
      a saturated aromatic anhydride or its equivalent,
   wherein the molar ratio of the compatibilizing unit to the plasticizing unit is in the range from 30:70 to 60:40.

2. The copolymer plasticizer according to claim 1, wherein the molar ratio of the compatibilizing unit to the plasticizing unit is in the range from 45:55 to 55:45.

3. The copolymer plasticizer according to claim 1, wherein the lower alkyl organic acid comprises a $C_3$ to $C_7$ alkyl backbone.

4. The copolymer plasticizer according to claim 1, wherein the organic acid is selected from lactic acid, butyric, valeric, and caprolactic acid, diphenolic acid, levulinic acid and their derivatives.

5. The copolymer plasticizer according to claim 1, wherein the lower alkyl organic acid comprises a hydroxyl moiety.

6. The copolymer plasticizer according to claim 1, wherein the plasticizing unit further comprises one or more difunctional alcohols.

7. The copolymer plasticizer according to claim 6, wherein the difunctional alcohol has a carbon number in the range from 2 to 10.

8. The copolymer plasticizer according to claim 6, wherein molar ratio of difunctional alcohols to multifunctional alcohols is from 5:95 to 95:5.

9. The copolymer plasticizer according to claim 6, wherein molar ratio of difunctional alcohols to multifunctional alcohols is from 40:60 to 60:40.

10. The copolymer plasticizer according to claim 6, wherein the difunctional alcohol is selected from 1,2 propanediol, 1,3 propanediol, ethylene glycol, diethylene glycol, triethylene glycol, neopentyl glycol, dipropylene glycol, dibromoneopentyl glycol, propoxylated bisphenol-A, ethoxylated bisphenol A, 2,2,4-trimethylpentane-1,3-diol, tetrabromobisphenol dipropoxy ether, 1,4-butanediol, 1,3-butanediol, hexanediol, 1,6 hexanediol, octanediol, cyclopentanediol, cyclohexanediol, cyclohexanedimethanol, and derivatives and mixtures thereof.

11. The copolymer plasticizer according to claim 1, wherein the multifunctional alcohol is selected from glycerin, trimethyl propanol, trimethoxypropane, trimethoxyethane, pentaerythritol, cyclohexanemethanediol, polyester oligomers of pentaerythritol, and mixtures thereof.

12. The copolymer plasticizer according to claim 1, wherein the plasticizing unit has a molar ratio of the aliphatic anhydride or its equivalent to the aromatic anhydride or its equivalent in the range from 99:1 to 80:20.

13. The copolymer plasticizer according to claim 1, wherein the copolymer plasticizer is amorphous.

14. The copolymer plasticizer according to claim 1, wherein the aliphatic anhydride or its equivalent is selected from maleic anhydride, itaconic anhydride, fumaric acid, and diacids of unsaturated fatty acids.

15. The copolymer plasticizer according to claim 1, wherein the saturated aromatic anhydride or its equivalent is selected from is selected from phthalic anhydride, terephthalic acid, isophthalic acid, and diphenolic acid.

16. The copolymer plasticizer according to claim 1, wherein the copolymer plasticizer has a weight average molecular weight between 2000 and 90,000 g/mol.

17. The copolymer plasticizer according to claim 1, wherein the copolymer plasticizer has a glass transition temperature from −20° C. to 30° C.

18. The copolymer plasticizer according to claim 1, blended with polylactic acid, wherein the blend has an increased elongation at break by at least 25% without a decrease in Young's modulus compared to the unblended polylactic acid.

19. The copolymer plasticizer according to claim 1, wherein the polyester plasticizing unit is formed from monomers further comprising a chain extending monomer.

20. The copolymer plasticizer according to claim 19, wherein the chain extending monomer is selected from diglycidyl ethers and epoxidized vegetable oils of linseed, soybean, or castor oil.

21. An amorphous copolymer plasticizer comprising:
a compatibilizing unit comprising a lower alkyl organic hydroxy acid having a carbon number in the range from 3 to 7; and
a polyester plasticizing unit formed from monomers comprising:
a multifunctional alcohol;
a difunctional alcohol having a carbon number in the range from 2 to 10, wherein molar ratio of difunctional alcohols to multifunctional alcohols is from 5:95 to 95:5;
an aliphatic anhydride or its equivalent; and
a saturated aromatic anhydride or its equivalent;
wherein the plasticizing unit has a molar ratio of the aliphatic anhydride or its equivalent to the aromatic anhydride or its equivalent in the range from 100:0 to 80:20;
wherein the molar ratio of the compatibilizing unit to the plasticizing unit is in the range from 30:70 to 60:40, wherein the copolymer plasticizer has a weight average molecular weight between 2000 and 90,000 g/mol, and wherein the copolymer plasticizer has a glass transition temperature between −20° C. to 30° C.

22. The amorphous copolymer plasticizer according to claim 21, wherein the difunctional alcohol is selected from 1,2 propanediol, 1,3 propanediol, ethylene glycol, diethylene glycol, triethylene glycol, polyethylene glycol, tetraethylene glycol, polytetrahydrofuran, neopentyl glycol, propylene glycol, dipropylene glycol, dibromoneopentyl glycol, propoxylated bisphenol-A, ethoxylated bisphenol A, 2,2,4-trimethylpentane-1,3-diol, tetrabromobisphenol dipropoxy ether, 1,4-butanediol, 1,3 butanediol, 1,5 pentanediol, 1,6 hexanediol, 1,7 heptanediol, octanediol, cyclopentanediol, cyclohexanediol, cyclohexanedimethanol, or their derivatives and mixtures thereof.

23. The amorphous copolymer plasticizer according to claim 21, wherein the multifunctional alcohol is selected from glycerin, trimethyl propanol, trimethoxypropane, trimethoxyethane, pentaerythritol, cyclohexanemethanediol, polyester oligomers of pentaerythritol, oligomeric polyesters of caprolactone, poly THF, and mixtures thereof.

24. The amorphous copolymer plasticizer according to claim 21, wherein the aliphatic anhydride or its equivalent is selected from maleic anhydride, itaconic anhydride, fumaric acid, and diacids of unsaturated fatty acids.

25. The amorphous copolymer plasticizer according to claim 21, wherein the saturated aromatic anhydride or its equivalent is selected from phthalic anhydride, terephthalic acid, isophthalic acid, and diphenolic acid.

26. A copolymer plasticizer comprising:
a compatibilizing unit selected from lactic acid, butyric, caprolactone, levulinic acid, valeric acid, and derivatives of these hydroxy acids; and
a polyester plasticizing unit formed from monomers comprising:
a multifunctional alcohol selected from glycerin, trimethyl propanol, pentaerythritol, cyclohexanemethanediol, polyester oligomers of pentaerythritol, and mixtures thereof;
an aliphatic anhydride or its equivalent selected from maleic anhydride, itaconic anhydride, fumaric acid, and diacids of unsaturated fatty acids, mixtures and equivalents thereof; and
a saturated aromatic anhydride or its equivalent selected from phthalic anhydride, terephthalic acid, and isophthalic acid, mixtures and equivalents thereof;
wherein the molar ratio of the compatibilizing unit to the plasticizing unit is in the range from 30:70 to 60:40.

27. The copolymer plasticizer according to claim 26, wherein the plasticizing unit further comprises one or more difunctional alcohols having a carbon number in the range from 2 to 10.

28. The copolymer plasticizer according to claim 27, wherein molar ratio of difunctional alcohols to multifunctional alcohols is from 95:5 to 5:95.

29. The copolymer plasticizer according to claim 27, wherein the difunctional alcohol is selected from 1,2 propanediol, 1,3 propanediol, ethylene glycol, diethylene glycol, triethylene glycol, polyethylene glycol, tetraethylene glycol, polytetrahydrofuran, neopentyl glycol, propylene glycol, dipropylene glycol, dibromoneopentyl glycol, propoxylated bisphenol-A, ethoxylated bisphenol A, 2,2,4-trimethylpentane-1,3-diol, tetrabromobisphenol dipropoxy ether, 1,4-butanediol, 1,3 butanediol, 1,5 pentanediol, 1,6 hexanediol, 1,7 heptanediol, octanediol, cyclopentanediol, cyclohexanediol, cyclohexanedimethanol, or their derivatives and mixtures thereof.

30. The copolymer plasticizer according to claim 1, wherein the copolymer plasticizer is grafted to the backbone of polyolefins using an unsaturation functionality of the copolymer plasticizer.

31. The copolymer plasticizer according to claim 1, wherein the copolymer plasticizer is a compatibilizer or an emulsifier for polyolefin/biopolyester blends.

32. The copolymer plasticizer according to claim 1, wherein the copolymer plasticizer is a compatibilizer or an emulsifier for polyolefin/starch blends.

* * * * *